(12) United States Patent
Davis

(10) Patent No.: US 10,859,111 B2
(45) Date of Patent: Dec. 8, 2020

(54) CAGE NUT FASTENER AND METHODS FOR TOOL-LESS INSTALLATION OF SAME

(71) Applicant: CHATSWORTH PRODUCTS, INC., Agoura Hills, CA (US)

(72) Inventor: Jared Keith Davis, Cedar Park, TX (US)

(73) Assignee: Chatsworth Products, Inc., Agoura Hills, CA (US)

( * ) Notice: Subject to any disclaimer, the term of this patent is extended or adjusted under 35 U.S.C. 154(b) by 68 days.

(21) Appl. No.: 16/172,060

(22) Filed: Oct. 26, 2018

(65) Prior Publication Data

US 2019/0063483 A1 Feb. 28, 2019

Related U.S. Application Data

(63) Continuation of application No. 15/364,912, filed on Nov. 30, 2016, now Pat. No. 10,337,550.

(Continued)

(51) Int. Cl.
*F16B 37/04* (2006.01)

(52) U.S. Cl.
CPC .......... *F16B 37/044* (2013.01); *F16B 37/043* (2013.01); *F16B 37/046* (2013.01)

(58) Field of Classification Search
CPC ..... F16B 37/044; F16B 37/043; F16B 37/046
See application file for complete search history.

(56) References Cited

U.S. PATENT DOCUMENTS

| 824,544 | A | 6/1906 | Hossege |
| 2,390,752 | A | 12/1945 | Tinnerman |

(Continued)

FOREIGN PATENT DOCUMENTS

| CN | 108431433 A | 8/2018 |
| FR | 1402979 A | 6/1965 |

(Continued)

OTHER PUBLICATIONS

Information Disclosure Statement (IDS) Letter Regarding Common Patent Application(s), dated Jun. 3, 2019.
Information Disclosure Statement (IDS) Letter Regarding Common Patent Application(s), dated Jan. 15, 2019.
"International Preliminary Report on Patentability" of the International Search Authority (ISA/US) in Chatsworth Products, Inc., International Patent Application Serial No. PCT/US2016/064135, dated Jun. 19, 2018 (8 pages).

(Continued)

*Primary Examiner* — Ryan J. Walters
(74) *Attorney, Agent, or Firm* — Tillman Wright, PLLC; James D. Wright; David R. Higgins

(57) ABSTRACT

A cage nut fastener, capable of installation against a frame member without the aid of tools, includes a spring cage and a nut retained within a space defined by the spring cage and prevented from rotation therein. The spring cage includes a back wall with a wall aperture therethrough, a cage arm extending in a forward direction from a side of the back wall, and a lever arm disposed at a side of the back wall that is opposite the cage arm. The nut includes a nut aperture therethrough that is generally aligned with the wall aperture of the back wall. The lever arm includes an extension portion that extends in a rearward direction behind the back wall of the spring cage. Application of a compression force upon the lever arm, without the aid of tools, manipulates the spring cage to a compressed state that facilitates positioning of a distal end of each of the cage arm and the lever arm through an aperture of a frame member so that, upon release of the compression force, the spring cage and the nut are secured against the frame member.

20 Claims, 11 Drawing Sheets

Related U.S. Application Data

(60) Provisional application No. 62/267,020, filed on Dec. 14, 2015.

(56) References Cited

U.S. PATENT DOCUMENTS

| | | | |
|---|---|---|---|
| 2,430,555 A | 11/1947 | Burke | |
| 2,459,953 A | 1/1949 | Mills | |
| 2,616,142 A | 11/1952 | Tinnerman | |
| 2,695,046 A * | 11/1954 | Tinnerman, III | F16B 37/044 |
| | | | 411/112 |
| 2,861,618 A | 11/1958 | Tinnerman | |
| 2,875,804 A | 3/1959 | Flora | |
| 2,972,494 A | 2/1961 | Dominic | |
| 3,025,897 A | 3/1962 | Gieleghem | |
| 3,035,624 A | 5/1962 | Jaworski | |
| 3,066,902 A | 12/1962 | Conil | |
| 3,192,823 A | 7/1965 | Munse | |
| 3,379,090 A | 4/1968 | Parkin | |
| 3,585,333 A | 6/1971 | Valle et al. | |
| 4,375,933 A | 3/1983 | Hassler et al. | |
| 4,379,537 A | 4/1983 | Perrault et al. | |
| 4,429,440 A | 2/1984 | Laughlin et al. | |
| 4,524,937 A | 6/1985 | Zizan | |
| 5,149,026 A | 9/1992 | Allen | |
| 5,391,084 A | 2/1995 | Krietzman | |
| 5,624,319 A | 4/1997 | Golczyk et al. | |
| 5,640,482 A | 6/1997 | Barry et al. | |
| 5,752,682 A | 5/1998 | Anderson | |
| 5,791,498 A | 8/1998 | Mills | |
| 5,806,811 A | 9/1998 | Viklund et al. | |
| 5,989,052 A | 11/1999 | Fields et al. | |
| 6,019,446 A | 2/2000 | Laboch et al. | |
| 6,105,218 A | 8/2000 | Reekie | |
| 6,129,316 A | 10/2000 | Bauer | |
| 6,170,784 B1 | 1/2001 | MacDonald et al. | |
| 6,220,554 B1 | 4/2001 | Daoud | |
| 6,227,502 B1 | 5/2001 | Derman | |
| 6,677,530 B2 | 1/2004 | Blaha et al. | |
| 6,715,619 B2 | 4/2004 | Kim et al. | |
| 6,746,193 B1 | 6/2004 | Drake | |
| 6,866,154 B2 | 3/2005 | Hartman et al. | |
| 7,093,725 B2 | 8/2006 | Hartman et al. | |
| 7,293,666 B2 | 11/2007 | Mattlin et al. | |
| 7,472,970 B2 | 1/2009 | Bergesch et al. | |
| 7,527,226 B2 | 5/2009 | Kusuda et al. | |
| 7,789,606 B2 | 9/2010 | Kosidlo, IV et al. | |
| 7,952,057 B2 | 5/2011 | Grelck | |
| 8,014,171 B2 | 9/2011 | Kelly et al. | |
| 8,056,868 B2 | 11/2011 | Vander Griend | |
| 8,235,634 B2 * | 8/2012 | Larsen | F16B 27/00 |
| | | | 411/112 |
| 8,263,863 B2 | 9/2012 | Young | |
| 8,459,918 B2 * | 6/2013 | Lin | F16B 37/044 |
| | | | 411/112 |
| 8,746,466 B2 | 6/2014 | Taylor | |
| 8,757,560 B2 | 6/2014 | Darnell | |
| 8,879,881 B2 | 11/2014 | Cote et al. | |
| 9,112,341 B2 | 8/2015 | Eshima et al. | |
| 9,363,922 B2 | 6/2016 | Larsen et al. | |
| 9,402,329 B1 | 7/2016 | Chen et al. | |
| 9,523,379 B2 | 12/2016 | Stothers | |
| 9,548,597 B2 | 1/2017 | Vacca et al. | |
| 9,903,407 B2 | 2/2018 | Hattori et al. | |
| 10,187,995 B2 | 1/2019 | Utz | |
| 10,337,550 B2 | 7/2019 | Davis et al. | |
| 10,547,145 B2 | 1/2020 | Bowen et al. | |
| 10,566,774 B1 | 2/2020 | Krietzman et al. | |
| 10,584,082 B2 | 3/2020 | Utz et al. | |
| 2003/0108385 A1 | 6/2003 | Finco et al. | |
| 2003/0156892 A1 | 8/2003 | Finco et al. | |
| 2004/0181916 A1 | 9/2004 | Arduini | |
| 2005/0076602 A1 | 4/2005 | Routhier | |
| 2006/0103270 A1 | 5/2006 | Bergesch et al. | |
| 2008/0062654 A1 | 3/2008 | Mattlin et al. | |
| 2013/0069501 A1 | 3/2013 | Liu | |

FOREIGN PATENT DOCUMENTS

| | | |
|---|---|---|
| FR | 2794501 A1 | 12/2000 |
| GB | 981072 A | 1/1965 |
| JP | 2019-502069 | 1/2019 |
| WO | 2017105840 A1 | 6/2017 |

OTHER PUBLICATIONS

"International Search Report" and "Written Opinion" of the International Search Authority (ISA/US) in Chatsworth Products Inc., International Patent Application Serial No. PCT/US2016/064135, dated Feb. 7, 2017 (10 pages).

* cited by examiner

CAGE NUT FASTENER AND METHODS FOR TOOL-LESS INSTALLATION OF SAME

CROSS REFERENCE TO RELATED APPLICATIONS

The present application is a U.S. continuation patent application of, and claims priority under 35 U.S.C. § 120 to, U.S. nonprovisional patent application Ser. No. 15/364,912, filed Nov. 30, 2016, which '912 application published as U.S. Patent Application Publication No. US 2017/0167523 A1 on Jun. 15, 2017, which '912 application and the application publication thereof are each incorporated by reference herein in their entirety, and which '912 application is a U.S. nonprovisional patent application of, and claims priority under 35 U.S.C. § 119(e) to, U.S. provisional patent application Ser. No. 62/267,020, filed Dec. 14, 2015 and entitled, "CAGE NUT FASTENER AND METHODS FOR TOOL-LESS INSTALLATION OF SAME," which '020 application is incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to fasteners used in connection with electronic equipment racks and cabinets, and, in particular, to cage nut fasteners capable of installation in electronic equipment racks and cabinets without the aid of tools.

Background

A cage nut fastener generally includes a nut disposed within a spring cage. The spring cage helps to ensure that the nut remains in a set orientation during installation. FIG. 1A is an orthogonal view of a conventional cage nut fastener 10 illustrating the state of the art. As shown in FIG. 1A, the spring cage 12 of a conventional cage nut fastener generally includes a pair of cage arms 13,14 that, at least partially, wrap around the nut 20. Each cage arm 13,14 includes an outwardly-extending tab 21,22 at a distal end thereof. The tabs 21,22, which are sometimes characterized as "wings," may be compressed toward one another so that the tabs can be inserted into an aperture (which usually, but not always, has a square shape) of corresponding size. Once positioned through the aperture and released, the tabs 21,22 spring back to their original, uncompressed position and effectively lock the nut 20 in place behind the aperture. A conventional threaded machine screw 11 or the like may then be installed through the square opening and into the nut 20, as shown in FIG. 1B. Within the field of electronic equipment racks and cabinets, cage nut fasteners are often used in connection with mounting rails and, in particular, to secure electronic equipment and accessories to electronic equipment racks and cabinets.

Conventional cage nut fasteners, such as that described above in connection with FIGS. 1A and 1B, generally require the use of a separate tool (e.g., a flat head screwdriver or other flat-bladed tool) in order to snap the spring cage 12 into and out from the square opening. To attach a conventional cage nut fastener 10, the outwardly-extending tab 21 of the first cage arm 13 is positioned, by hand, through the aperture and against an edge thereof. From the other side of the aperture, the flat-bladed tool is then used as a lever to force or compress the second cage arm 14 inwardly so that the outwardly-extending tab 22 of the second cage arm 14 can be pulled through the aperture. Once the outwardly-extending tab 22 of the second cage arm 14 has been maneuvered fully through the aperture, the tool is disengaged and the second cage arm 14 is permitted to spring back to an uncompressed position. The outwardly-extending tabs 21,22 of the cage arms 13,14 push outwardly against the sides of the aperture and lock the cage nut fastener 10 against the mounting rail or other equipment component. The nut 20 embedded within the spring cage 12 is thus secured in a position to accommodate a threaded fastener or the like.

When electronic equipment is mounted in a rack or cabinet, there is often a need to install several cage nut fasteners at various locations within the rack or cabinet. Indeed, in the context of a computer server cabinet, hundreds of such fasteners may be required in order to facilitate installation of necessary equipment and accessories. Notably, when larger quantities of cage nut fasteners are required, the process of installing each fastener with a separate tool can become cumbersome and time-consuming. Furthermore, removal of such fasteners is equally tedious, imposing an equivalently high burden if equipment is being relocated or otherwise uninstalled.

Accordingly, in order to reduce assembly time as well as relocation costs, a need exists for a cage nut fastener that can be installed more efficiently in electronic equipment racks and cabinets.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect includes a cage nut fastener capable of installation against a frame member without the aid of tools. The cage nut fastener includes a spring cage having at least one cage arm and at least one lever arm and further includes a nut retained within the spring cage by the at least one cage arm. The lever arm extends in a rearward direction away from the spring cage. Application of a force upon the lever arm manipulates the spring cage to a compressed state in order to facilitate clamping installation of the cage nut fastener against the frame member without the aid of tools.

In a feature of this aspect, the lever arm may include first and second aligned portions that, when squeezed together, maneuver a distal tab of the lever arm. In another feature of this aspect, at least one of the first and second aligned portions may be curved. In still another feature of this aspect, an outermost of the first and second aligned portions may be curved.

In other features of this aspect, the force may be an inward compression force; the at least one cage arm and the at least one lever arm may be disposed at opposite sides of the spring cage; and/or the at least one lever arm may include a pair of lever arms disposed at opposite sides of the spring cage.

In another feature of this aspect, the nut may be a floating nut. In another feature of this aspect, the nut may be fixed within the spring cage. In still another feature of this aspect, the nut may be integral with the spring cage.

In another feature of this aspect, the cage nut fastener may be made, at least in part, from a metal material. In another feature of this aspect, the cage nut fastener may be made, at least in part, from a plastic material. In still another feature of this aspect, the cage nut fastener may be made using an injection molding process.

In another feature of this aspect, the lever arm may be a separate component attachable to the spring cage.

Broadly defined, the present invention according to another aspect includes a cage nut fastener capable of installation against a frame member without the aid of tools. The cage nut fastener includes a nut, a cage for retaining the nut and a lever arm. The lever arm includes an extension portion, extending in a rearward direction away from the nut, and a hooking portion, disposed in front of the nut. The extension portion and the hooking portion are disposed at opposite sides of the cage nut fastener. Application of a force upon the lever arm maneuvers the hooking portion to a compressed state in order to facilitate clamping installation of the cage nut fastener against the frame member without the aid of tools.

Broadly defined, the present invention according to another aspect includes a method of installing a cage nut fastener against a frame member without the aid of tools. The method includes: providing a cage nut fastener having a spring cage and a nut retained within the spring cage by at least one cage arm, wherein the spring cage includes at least one lever arm extending in a rearward direction away from the spring cage; and applying a force upon the lever arm to manipulate the spring cage to a compressed state in order to facilitate clamping installation of the cage nut fastener against the frame member without the aid of tools.

In a feature of this aspect, the lever arm may include first and second aligned portions. In another feature of this aspect, the method may further include squeezing the first and second aligned portions toward one another. In another feature of this aspect, at least one of the first and second aligned portions may be curved. In still another feature of this aspect, an outermost of the first and second aligned portions may be curved.

In another feature of this aspect, the method may further include: positioning a distal tab of the at least one cage arm against an edge of an aperture in the frame member; and while the force is being applied, rotating the cage nut fastener such that a distal tab of the at least one lever arm extends through the aperture. In another feature of this aspect, the method may further include releasing the force so that the spring cage returns to an uncompressed state, thereby clamping the cage nut fastener against the frame member.

In features of this aspect, the force may be an inward compression force; the at least one cage arm and the at least one lever arm may be disposed at opposite sides of the spring cage; and/or the at least one lever arm may include a pair of lever arms disposed at opposite sides of the spring cage.

Broadly defined, the present invention according to another aspect includes a cage nut fastener substantially as shown and described.

Broadly defined, the present invention according to another aspect includes a cage nut fastener capable of installation against a frame member without the aid of tools, substantially as shown and described.

Broadly defined, the present invention according to another aspect includes a method of installing a cage nut fastener against a frame member without the aid of tools, substantially as shown and described.

Broadly defined, the present invention according to another aspect includes cage nut fastener capable of installation against a frame member without the aid of tools. The cage nut fastener includes a spring cage and a nut retained within a space defined by the spring cage and prevented from rotation therein. The spring cage includes a back wall with a wall aperture therethrough, a cage arm extending in a forward direction from a side of the back wall, and a lever arm disposed at a side of the back wall that is opposite the cage arm. The nut includes a nut aperture therethrough that is generally aligned with the wall aperture of the back wall. The lever arm includes an extension portion that extends in a rearward direction behind the back wall of the spring cage. Application of a compression force upon the lever arm, without the aid of tools, manipulates the spring cage to a compressed state that facilitates positioning of a distal end of each of the cage arm and the lever arm through an aperture of a frame member so that, upon release of the compression force, the spring cage and the nut are secured against the frame member.

In a feature of this aspect, the lever arm may include outer and inner aligned portions, the outer aligned portion being compressible toward the inner aligned portion. In another feature of this aspect, the outer aligned portion may be arc-shaped so that the outer aligned portion curves away from the inner aligned portion.

In other features of this aspect, each of the cage arm and the lever arm may include an outwardly-extending tab at the distal end thereof; and/or the cage nut fastener may further include one or more additional cage arms extending in a forward direction from one or more additional sides of the back wall.

In another feature of this aspect, the nut may be a floating nut.

In another feature of this aspect, the nut may be prevented from moving within the spring cage.

In other features of this aspect, the nut and the spring cage may each be part of a unitary body; the spring cage may be made, at least in part, from a metal material; and/or the spring cage may be made, at least in part, from a polymeric material.

Broadly defined, the present invention according to another aspect includes a cage nut fastener capable of installation against a frame member without the aid of tools. The cage nut fastener includes a spring cage a nut retained within a space defined by the spring cage and prevented from rotation therein. The spring cage includes a back wall with a wall aperture therethrough, a cage arm extending in a forward direction from a side of the back wall, and a pair of lever arms disposed at opposite sides of the back wall. The nut includes a nut aperture therethrough that is generally aligned with the wall aperture of the back wall. Each lever arm includes an extension portion that extends in a rearward direction behind the back wall of the spring cage. Application of a compression force upon at least one of the pair of lever arms, without the aid of tools, manipulates the spring cage to a compressed state that facilitates positioning of a distal end of each of the pair of lever arms through an aperture of a frame member so that, upon release of the compression force, the spring cage and the nut are secured against the frame member.

In a feature of this aspect, each lever arm may include outer and inner aligned portions. In another feature of this aspect, each outer aligned portion may be compressible toward the respective inner aligned portion. In another feature of this aspect, compression of either outer aligned portion toward the respective inner aligned portion may manipulate the spring cage to the compressed state. In another feature of this aspect, at least one of the outer aligned portions may be arc-shaped to curve away from the respective inner aligned portion.

In other features of this aspect, each of the pair of lever arms may include an outwardly-extending tab at the distal end thereof; and/or the cage nut fastener may further include one or more additional cage arms extending in a forward direction from one or more additional sides of the back wall.

In another feature of this aspect, the nut may be a floating nut.

In another feature of this aspect, the nut may be prevented from moving within the spring cage.

In other features of this aspect, the nut and the spring cage may each be part of a unitary body; the spring cage may be made, at least in part, from a metal material; and/or the spring cage may be made, at least in part, from a polymeric material.

Broadly defined, the present invention according to another aspect includes a cage nut fastener capable of installation against a frame member without the aid of tools. The cage nut fastener includes a spring cage and a nut retained within a space defined by the spring cage and prevented from rotation therein. The spring cage that includes a back wall with a wall aperture therethrough, a cage arm extending in a forward direction from a side of the back wall, and a lever arm. The nut includes a nut aperture therethrough that is generally aligned with the wall aperture of the back wall. The lever arm includes an extension portion, arranged at a first side of the spring cage and extending in a rearward direction behind the back wall of the spring cage, and the lever arm further includes a hooking portion, passing behind the back wall from the first side of the spring cage to a second side of the spring cage, opposite the first side, and having a distal end that terminates in front of the nut. Application of a compression force upon the lever arm, without the aid of tools, manipulates the spring cage to a compressed state that facilitates positioning each of a distal end of the cage arm and the distal end of the hooking portion of the lever arm through an aperture of a frame member so that, upon release of the compression force, the spring cage and the nut are secured against the frame member.

In a feature of this aspect, the hooking portion of the lever arm may include an outwardly-extending tab at the distal end thereof. In another feature of this aspect, the cage arm may include an outwardly-extending tab at the distal end thereof that extends in a direction opposite to the direction of the outwardly-extending tab of the hooking portion of the lever arm.

In other features of this aspect, the lever arm may include an aperture therethrough that is generally aligned with the nut aperture of the nut and the wall aperture of the back wall; the nut may be prevented from moving within the spring cage; the nut and the spring cage may each be part of a unitary body; the spring cage may be made, at least in part, from a metal material; and/or the spring cage may be made, at least in part, from a polymeric material.

Broadly defined, the present invention according to another aspect includes a method of installing a cage nut fastener against a frame member without the aid of tools. The method includes: providing a cage nut fastener having a spring cage and a nut prevented from rotation within the spring cage, the spring cage including a cage arm and a lever arm, the lever arm including at least a portion that extends in a rearward direction behind a back wall of the spring cage; positioning a distal end of the cage arm through an aperture of a frame member so that the distal end rests against a side of the aperture; applying a compression force upon the lever arm, without the aid of tools, to manipulate the spring cage to a compressed state; positioning a distal end of the lever arm through the aperture; and releasing the compression force so that the spring cage returns to an uncompressed state, with distal ends of each of the cage arm and the lever arm pushing against respective opposite sides of the aperture, thereby securing the spring cage and the nut against the frame member.

In a feature of this aspect, the cage arm and the lever arm may be disposed at opposite sides of the spring cage.

In another feature of this aspect, each of the cage arm and the lever arm may include an outwardly-extending tab at a distal end thereof. In another feature of this aspect, the outwardly-extending tab of the lever arm may be disposed at a side of the spring cage that is offset from the portion of the lever arm that extends behind the back wall thereof.

In another feature of this aspect, the lever arm may include outer and inner aligned portions. In another feature of this aspect, the outer aligned portion may be arc-shaped so that the outer aligned portion curves away from the inner aligned portion. In another feature of this aspect, applying a compression force upon the lever arm may include squeezing the outer aligned portion toward the inner aligned portion.

In another feature of this aspect, positioning the distal end of the lever arm through the aperture may include rotating the spring cage about an axis.

Broadly defined, the present invention according to another aspect includes a method of installing a cage nut fastener against a frame member without the aid of tools. The method includes: providing a cage nut fastener having a spring cage and a nut prevented from rotation within the spring cage, the spring cage including a pair of lever arms arranged at opposite sides thereof, each lever arm extending in a rearward direction behind a back wall of the spring cage; applying a compression force upon at least one of the pair of lever arms, without the aid of tools, to manipulate the spring cage to a compressed state; positioning a distal end of each of the pair of the lever arms through an aperture of a frame member; and releasing the compression force so that the spring cage returns to an uncompressed state, with distal ends of each of the pair of lever arms pushing against respective opposite sides of the aperture, thereby securing the spring cage and the nut against the frame member.

In a feature of this aspect, positioning the distal end of each of the pair of the lever arms through the aperture may include positioning the distal end of a first of the pair of cage arms through the aperture before positioning the distal end of a second of the pair of cage arms through the aperture. In another feature of this aspect, the method may further include positioning the distal end of the first of the pair of lever arms to rest against a side of the aperture. In another feature of this aspect, positioning the distal end of the second of the pair of lever arms through the aperture may include rotating the spring cage about an axis.

In another feature of this aspect, applying a compression force upon at least one of the pair of lever arms may include applying a compression force upon both lever arms simultaneously.

In another feature of this aspect, each of the pair of lever arms may include outer and inner aligned portions. In another feature of this aspect, applying a compression force upon at least one of the pair of lever arms may include squeezing the outer aligned portion of at least one of the pair of lever arms toward the respective inner aligned portion. In another feature of this aspect, the outer aligned portion of at least one of the pair of lever arms may be arc-shaped to curve away from the respective inner aligned portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1A:
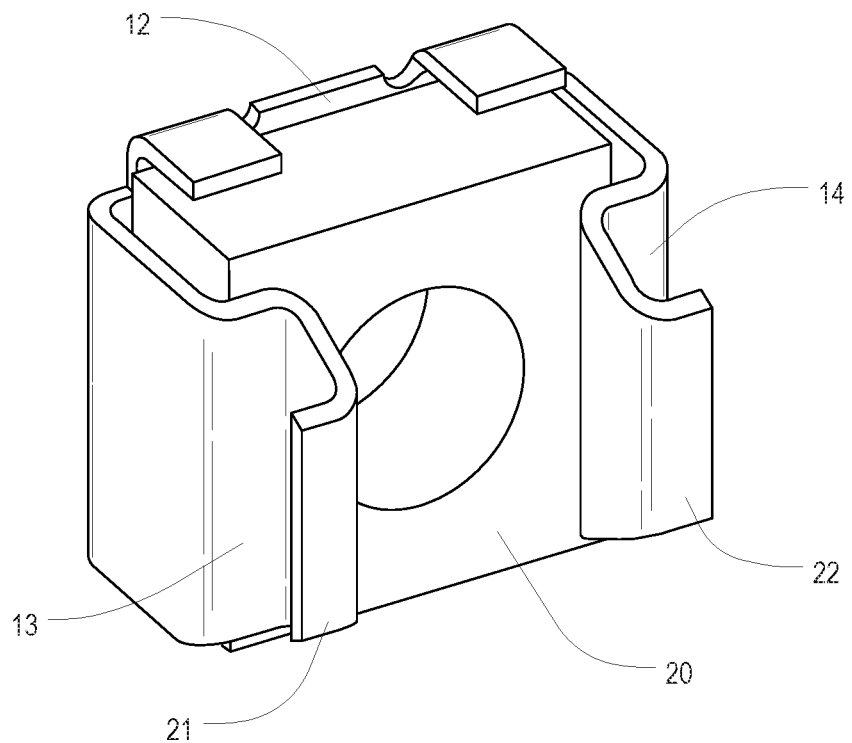
FIG. 1A is an orthogonal view of a conventional cage nut fastener that includes a nut and a spring cage.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2A:
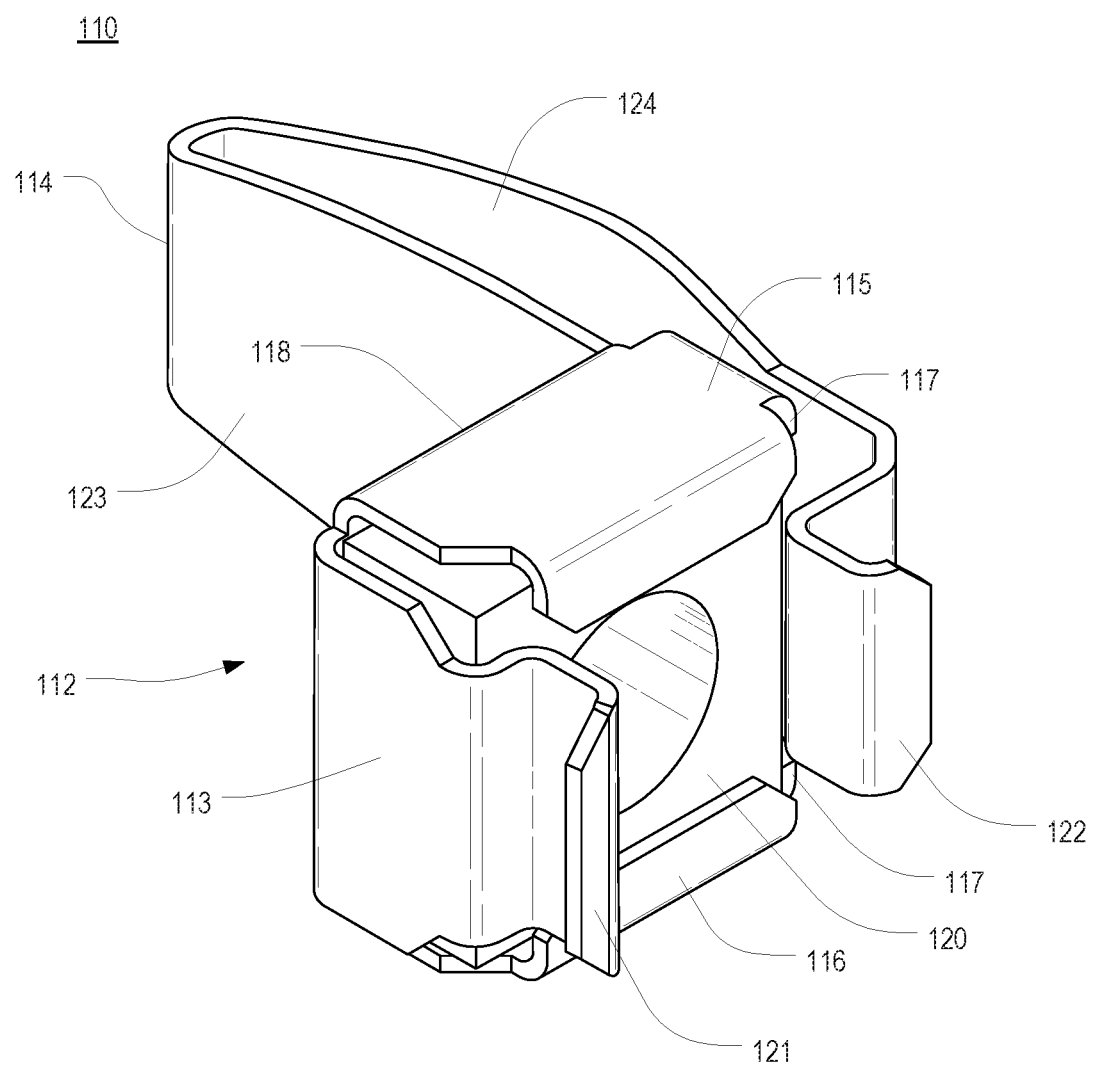
FIGS. 2A and 2B are isometric front and rear views of a cage nut fastener in accordance with a preferred embodiment of the present invention.
Figure 2B:
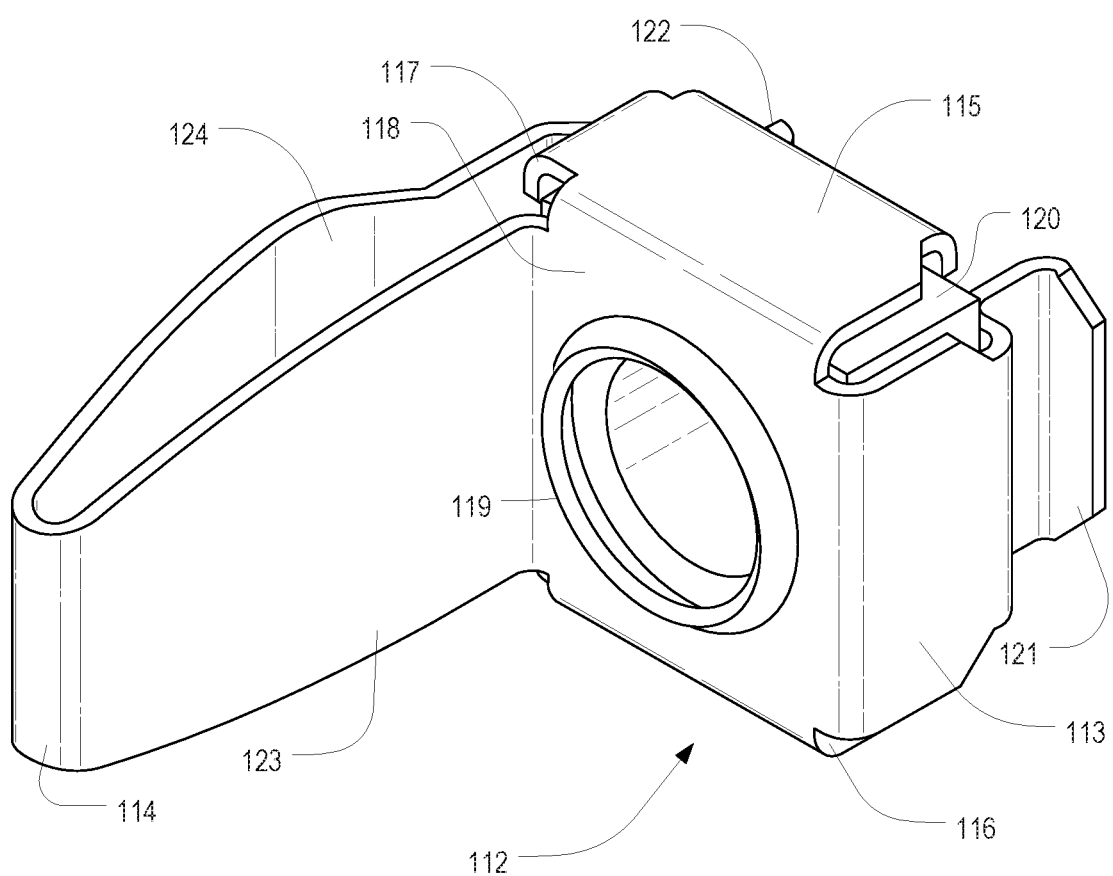

FIGS. 2A and 2B are isometric front and rear views of a cage nut fastener 110 in accordance with a preferred embodiment of the present invention. The cage nut fastener 110 of FIGS. 2A and 2B includes a nut 120 disposed within a spring cage 112, which retains the nut 120 in a set orientation. The spring cage 112 includes a back wall 118 and a plurality of cage arms 113,115,116, extending from the back wall 118, that retain the nut 120 by wrapping around the sides and at least part of the front thereof. Though the embodiment of FIGS. 2A and 2B depicts three cage arms 113,115,116, it is contemplated that a cage nut fastener within the scope of the present invention can accommodate more or fewer cage arms. Additional flanges 117, extending from sides of one or more of the cage arms 113,115,116, may also be provided to wrap around the sides of the nut 120 to provide additional retention. The back wall 118 of the spring cage 112 includes an aperture 119 therethrough that is aligned with the threaded opening in the nut 120 such that the nut 120 and the spring cage 112 are capable of accommodating a fastener 11 extending through both.

In a contemplated embodiment, the nut 120 is a floating nut that, although retained within the spring cage 112 and prevented from rotating, is not fixed to the spring cage 112 and is thus capable of at least slight movement within the cage 112. In other contemplated embodiments, the nut 120 is clamped firmly by the cage arms (i.e., fixed), or is part of a unitary structure that includes the cage, and is thus prevented from movement within, or relative to, the spring cage.

Figure 1B:
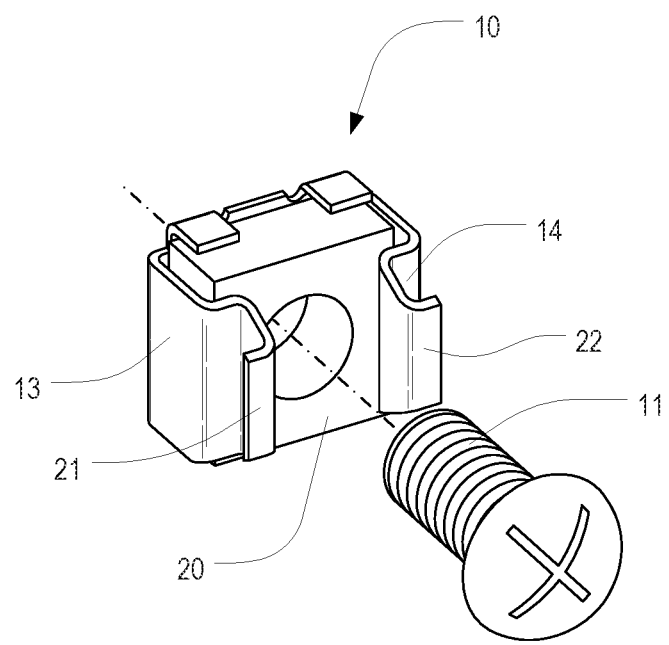
FIG. 1B is an orthogonal view of the cage nut fastener of FIG. 1A, shown together with a conventional machine screw.

In addition to the plurality of cage arms 113,115,116, the spring cage 112 further includes a lever arm 114 disposed at a side thereof. Instead of simply cradling the nut 120 (like the cage arm of a conventional cage nut fastener, as in FIGS. 1A and 1B), the lever arm 114 first extends in a rearward direction from the back wall 118, away from the nut 120, and then doubles back upon itself to extend in a forward direction, past the side of the cage 112 and around to the front of the nut 120. In this regard, the lever arm 114 includes inner and outer portions 123,124 that are generally aligned with one another, with the outer portion 124 being deflectable relative to the inner portion 123. Additionally, in at least some contemplated embodiments, the outer portion 124 of the lever arm 114 is curved away from the inner portion 123 so as to provide additional space (i.e., a larger gap) between the portions 123,124. As will be explained in greater detail below, the lever arm 114 helps to facilitate installation of the cage nut fastener 110 on a frame member or other component without the aid of tools.

As shown in FIGS. 2A and 2B, the lever arm 114 includes an outwardly-extending tab 122 at a distal end thereof. The cage arm 113 that is disposed at a side of the spring cage 112 opposite to that of the lever arm 114 likewise includes an outwardly-extending tab 121. Together, the outwardly-extending tabs 121,122 operate to facilitate securement of the cage nut fastener 110 to a mounting rail, frame member, or other equipment component.

Figure 3:
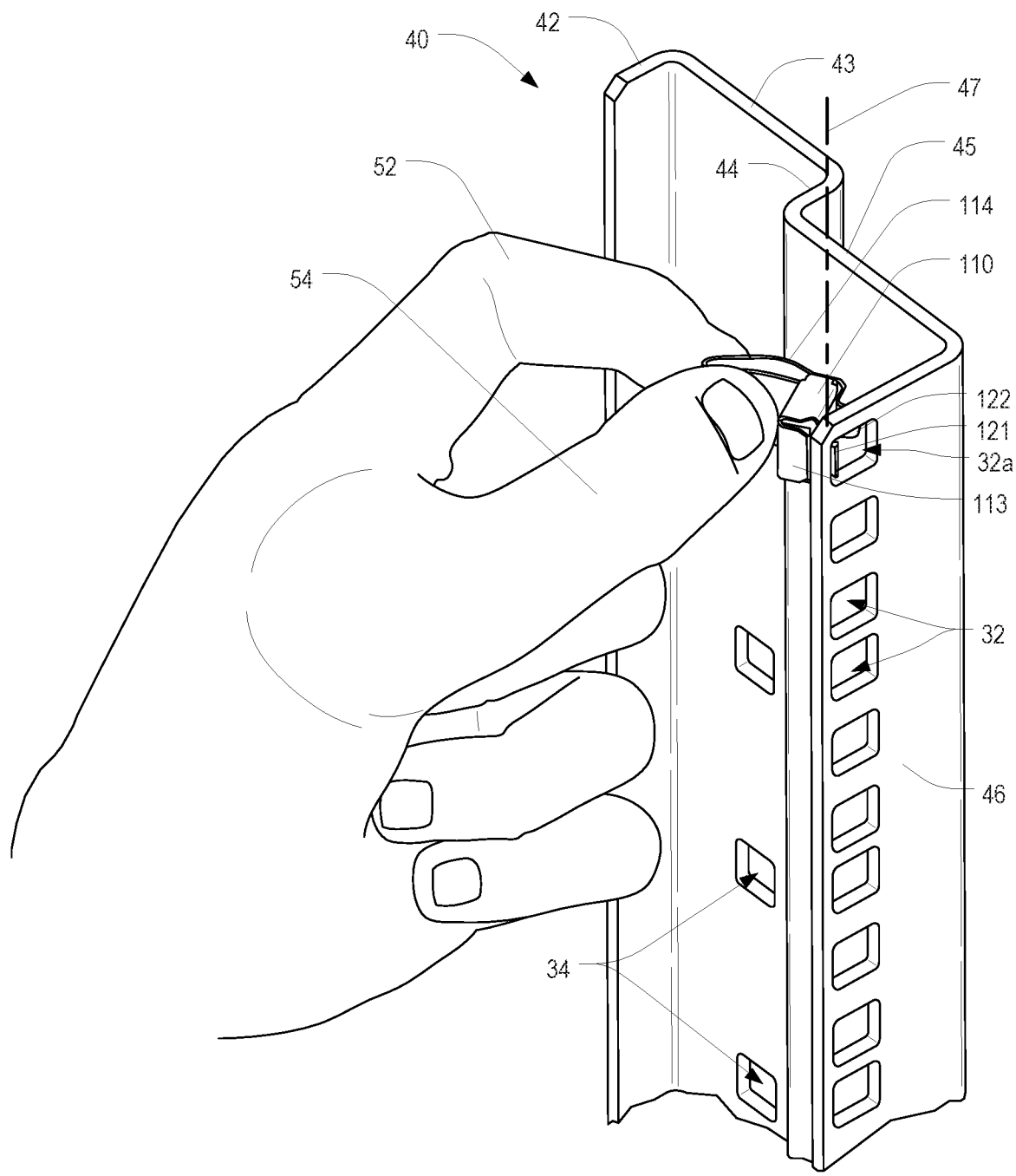
FIG. 3 is an isometric view illustrating installation of the cage nut fastener of FIGS. 2A and 2B on a frame member.
Figure 4:
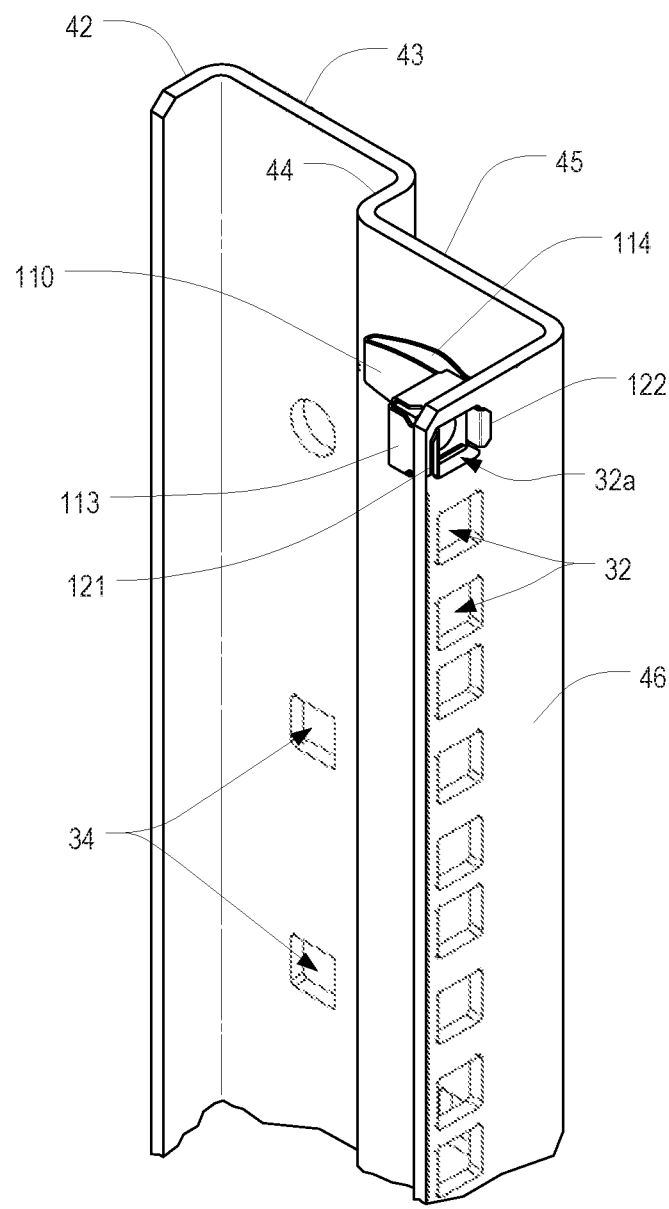
FIG. 4 is an isometric view of the cage nut fastener and frame member of FIG. 3, shown after installation is complete.

FIG. 3 is an isometric view illustrating installation of the cage nut fastener 110 of FIGS. 2A and 2B on a frame member 40, and FIG. 4 is an isometric view of the cage nut fastener 110 and frame member 40 of FIG. 3, shown after installation is complete. The frame member 40 depicted in FIG. 3 includes a plurality of mounting surfaces 42,43,44, 45,46 arranged orthogonally relative to one another. One or more of the mounting surfaces 43,46 include apertures 32,34 sized to accommodate a cage nut fastener in accordance with one or more preferred embodiments of the present invention. Though the apertures 32,34 of the frame member 40 are generally square-shaped (with rounded corners), it is contemplated that apertures may have other shapes as well, including apertures with circular or rectangular shapes.

To fasten the cage nut fastener 110 to the frame member 40 without the aid of tools, a user can grasp and squeeze the lever arm 114 of the fastener 110 to apply a compression force thereon. As shown in FIG. 3, it is contemplated that a user can apply such a force by squeezing the lever arm 114 between the user's index finger 52 and thumb 54. Application of an inward compression force upon the lever arm 114 (and, particularly, upon the outer portion 124 of the lever arm 114) compresses the outer portion 124 toward the inner portion 123 and, effectively, manipulates the spring cage 112 to a compressed state. With the outwardly-extending tab 121 of the cage arm 113 seated against an edge of a selected aperture 32a, the cage nut fastener 110 (in the compressed state) can be rotated around an axis 47 such that the outwardly-extending tab 122 of the lever arm 114 is also positioned through the aperture 32a. With both tabs 121,122 positioned through the selected aperture 32a of the frame member 40, the inward compression force against the lever arm 114 can be released, thereby permitting the spring cage 112 to return to an uncompressed state such that the tabs 121,122 push outwardly against the sides of the aperture 32a. In this manner, the cage nut fastener 110 becomes clamped or secured against the frame member 40 (as can be seen in FIG. 4).

The lever arm 114 provides the user with a mechanical advantage during the installation process. In particular, the lever arm 114 provides a user with enhanced leverage in manipulating the spring cage 112, by hand, in such a way that the tabs 121,122 may be inserted into the selected aperture 32a of the frame member 40, thereby eliminating the need for tools during the installation process. It is further contemplated that torque applied to the cage nut fastener 110 (such as by rotating the cage nut fastener 110 into the selected aperture 32a) further simplifies the installation process—particularly when torque is used in combination with a compression force applied to the lever arm 114.

Figure 5:
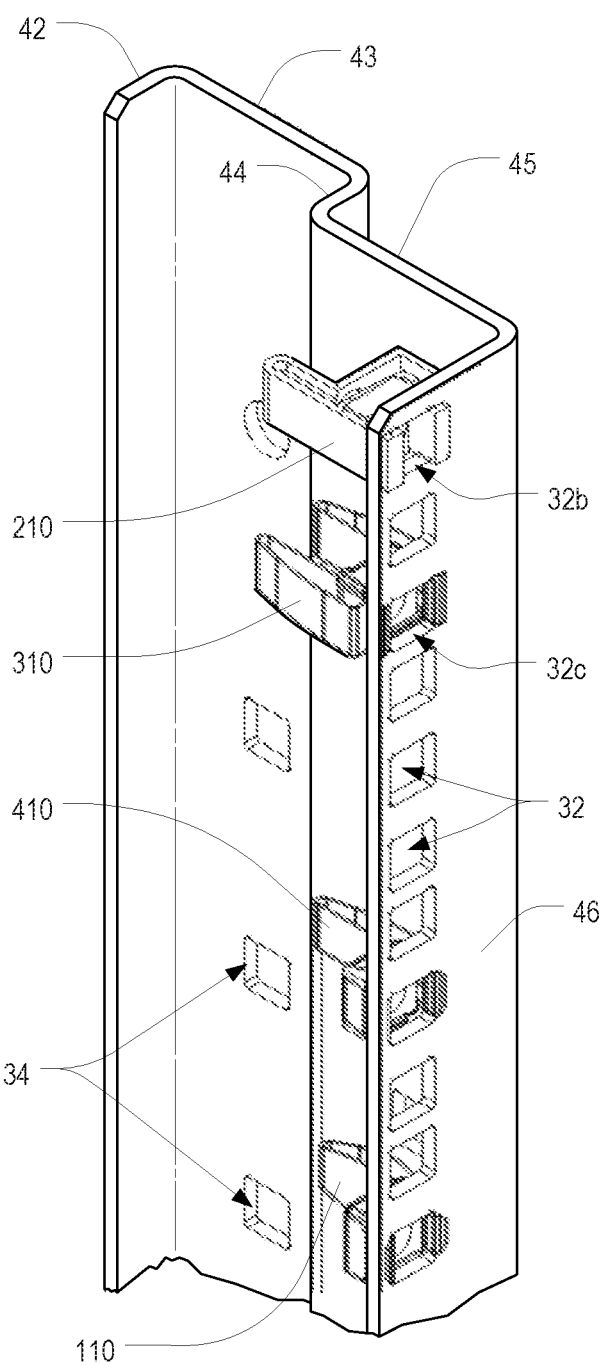
FIG. 5 is an isometric view of the cage nut fastener of FIGS. 2A and 2B shown in stalled on the frame member of FIG. 3, together with three alternative cage nut fasteners, each in accordance with a preferred embodiment of the present invention, shown installed on the same frame member.

FIG. 5 is an isometric view of the cage nut fastener 110 of FIGS. 2A and 2B installed on the frame member 40 of FIG. 3, together with three alternative cage nut fasteners 210,310,410, each in accordance with a preferred embodiment of the present invention, and shown installed on the same frame member 40. As shown in FIG. 5, a single frame member 40 is capable of accommodating a plurality of cage nut fasteners 110,210,310,410, which can be installed and/or arranged in any configuration desired by the user, including installation on different mounting surfaces 43,46 of the same frame member 40. (It will be appreciated that the cage nut fastener 110 of FIG. 4 is shown installed in a different location on the frame member 40 in FIG. 5.)

Figure 6:
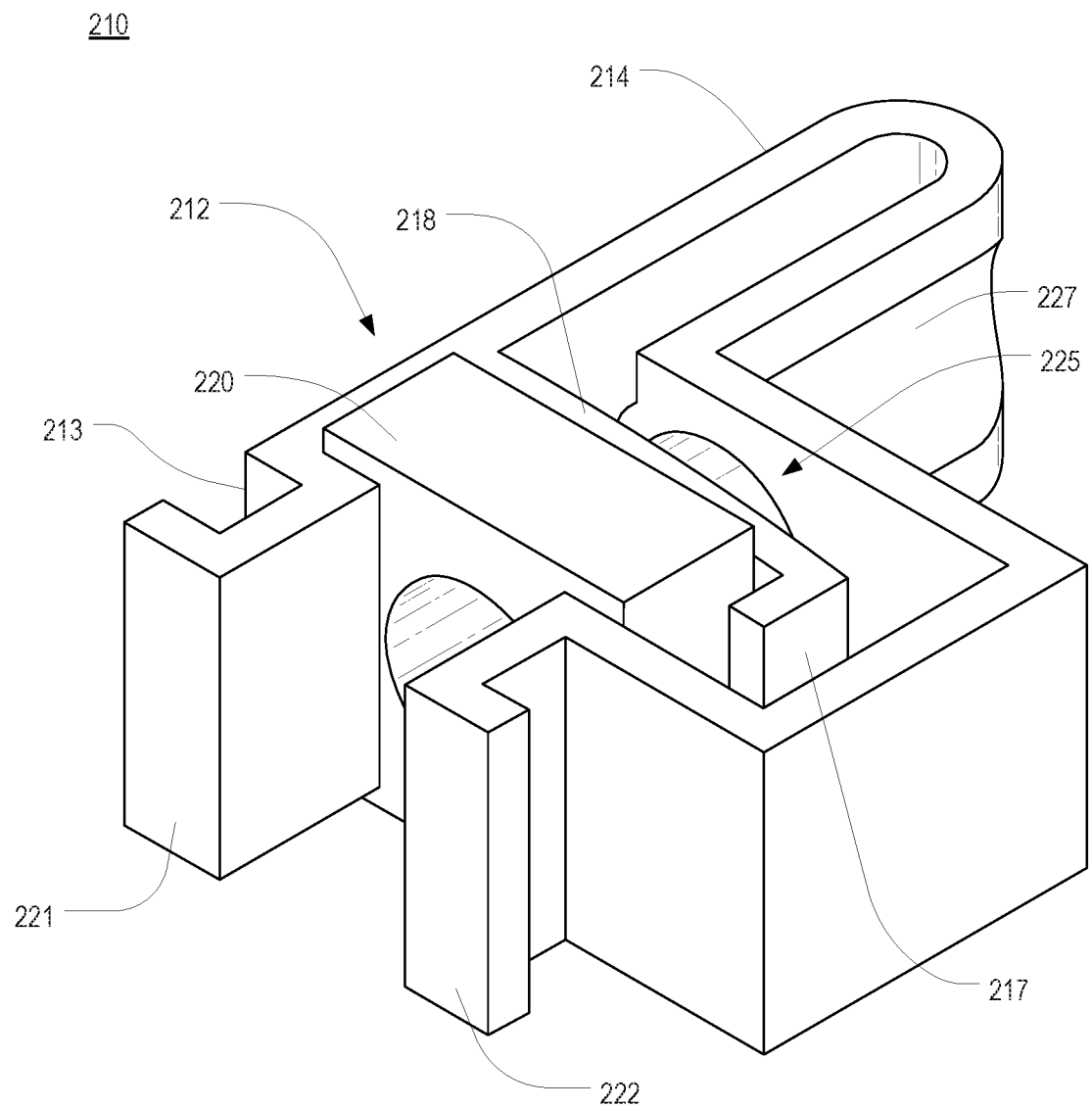
FIG. 6 is an isometric view of the first alternative cage nut fastener of FIG. 5.

FIG. 6 is an isometric view of the first alternative cage nut fastener 210 of FIG. 5. The cage nut fastener 210 of FIG. 6 is somewhat similar in operation to the cage nut fastener 110 discussed above in connection with FIGS. 2-4. The cage nut fastener 210 of FIGS. 2A and 2B includes a nut 220 disposed within a spring cage 212, which retains the nut 220 in a set orientation. The spring cage 212 includes a back wall 218 and one or more cage arms 213 extending from the back wall 218 that retain the nut 120 by wrapping around the sides and at least a portion of the front thereof. Additional flanges 217, extending from the back wall 218 or from sides of the one or more cage arms 213, may also be provided around the sides of the nut 120 to provide additional retention. The one or more cage arms 213 may each have an outwardly-extending tab 221 at a distal end thereof. The back wall 218 of the spring cage 212 includes an aperture (not illustrated) therethrough that is aligned with the threaded opening in the nut 220 such that the nut 220 and the spring cage 212 are capable of accommodating a fastener extending through both.

In addition to the one or more cage arms 213, the spring cage 212 further includes a lever arm 214 disposed at a side thereof that provides a mechanical advantage to facilitate installation of the fastener without the aid of tools. The lever arm 214 first extends in a rearward direction from the back wall 218, away from the nut 220, and then doubles back upon itself to extend in a forward direction toward the back wall 218. Unlike the cage nut fastener 110 of FIGS. 2-4, the lever arm 214 then extends from one side of the spring cage 212 to the other, behind the back wall 218 thereof, and then around the opposite side of the nut 220, before terminating in an outwardly-extending tab 222 at a distal end. In this regard, the portion of the lever arm 214 that extends away from the nut 220 is disposed at the same side of the spring cage 212 as at least one of the one or more cage arms 213 (i.e., at a fixed end of the spring cage 212), which is also the side of the spring cage 212 that is opposite of, or offset from, the outwardly-extending tab 222. This configuration of the lever arm 214 results in the outwardly-extending tabs 221, 222 of the spring cage 212 extending in opposite directions from one another (as depicted in FIG. 6).

Furthermore, because the lever arm 214 extends rearwardly behind the back wall 218 of the spring cage 212 and passes behind it, the lever arm 214 includes an aperture 225 that is aligned with the aperture through the back wall 218 of the spring cage 212. In this regard, the lever arm 214 (and, in particular, the portion of the lever arm 214 that passes behind the back wall 218) is likewise capable of accommodating a fastener extending through the nut 220 and the back wall 218 of the spring cage 212. Additionally, to avoid interference with such a fastener, the lever arm 214 can include a curved surface 227 along the rearwardly-extending portion thereof, adjacent to where a fastener would pass through the aperture 225.

The cage nut fastener 210 of FIG. 6 can be installed against a frame member 40 in a manner similar to that of the cage nut fastener 110 of FIGS. 2-4, without the aid of tools. With reference to FIGS. 5 and 6, the outwardly-extending tab 221 of the fixed end of the spring cage 212 can be seated against an edge of a selected aperture 32b of the frame member 40, and the spring cage 212 can be compressed by application of an inward compression force against the lever arm 214. With the spring cage 212 in a compressed state, the cage nut fastener 210 can be rotated so that the outwardly-extending tab 222 of the lever arm 214 is also positioned through the aperture 32b. With both tabs 221,222 positioned through the selected aperture 32b of the frame member 40, the inward compression force against the lever arm 214 can be released, thereby permitting the spring cage 212 to return to an uncompressed state such that the tabs 221,222 push outwardly against the sides of the aperture 32b. In this manner, the cage nut fastener 210 becomes clamped or secured against the frame member 40 (as can be seen in FIG. 5).

As with the cage nut fastener 110 discussed above in connection with FIGS. 2-4, the lever arm 214 of the cage nut fastener 210 provides the user with a mechanical advantage during the installation process. In particular, the lever arm 214 provides a user with enhanced leverage in manipulating the spring cage 212, by hand, in such a way that the tabs 221,222 may be inserted into the selected aperture 32b of the frame member 40, thereby eliminating the need for tools during the installation process. It is further contemplated that torque applied to the cage nut fastener 210 (such as by rotating the cage nut fastener 210 into the selected aperture 32b) further simplifies the installation process—particularly when torque is used in combination with a compression force applied to the lever arm 214.

Figure 7:
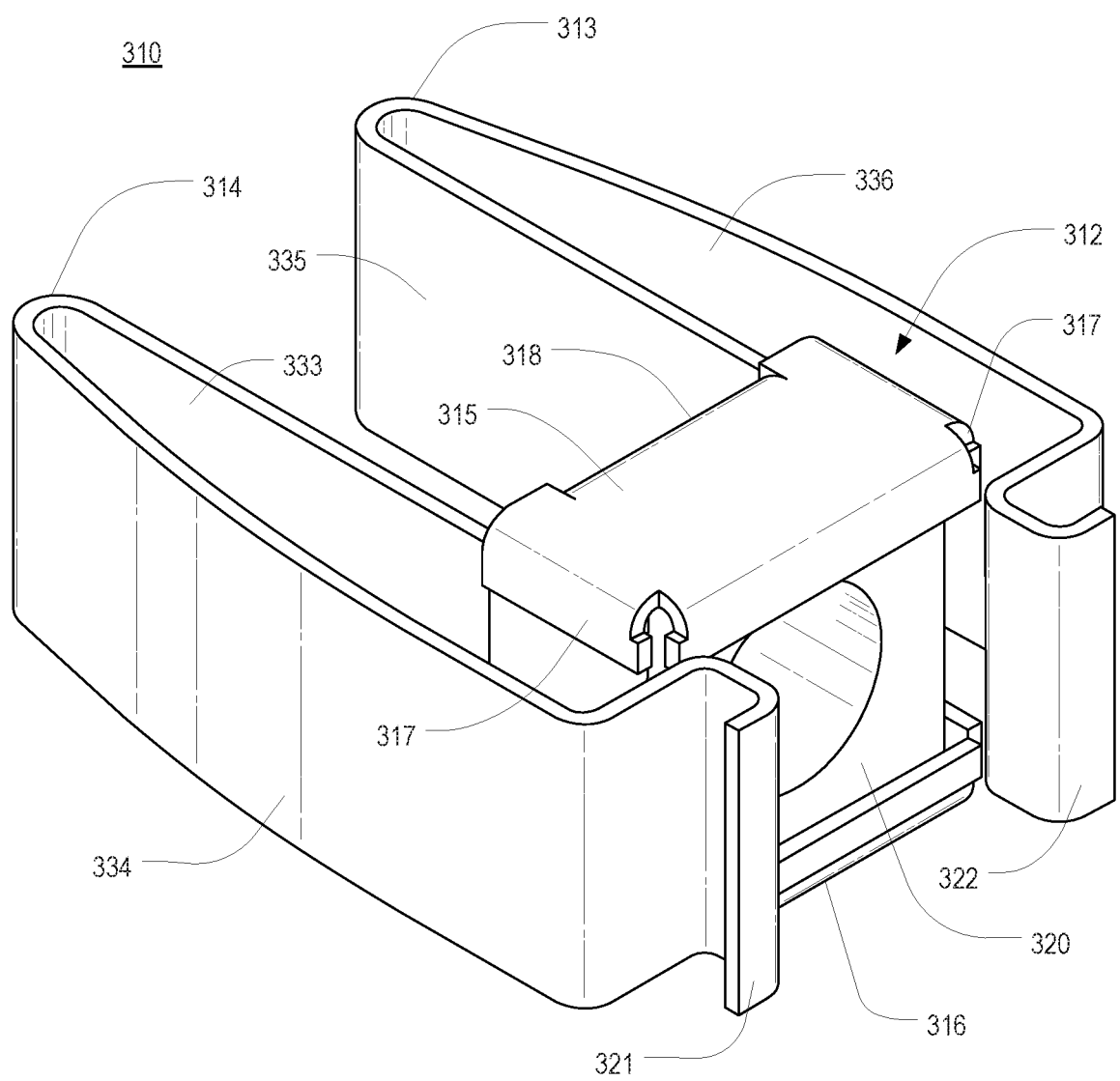
FIG. 7 is an isometric view of the second alternative cage nut fastener of FIG. 5.

FIG. 7 is an isometric view of the second alternative cage nut fastener 310 of FIG. 5. The cage nut fastener 310 of FIG. 7 is somewhat similar in form and in operation to the cage nut fastener 110 discussed above in connection with FIGS. 2-4, but with a pair of lever arms 313,314 (instead of a single lever arm) disposed at opposite sides of a spring cage 312. The cage nut fastener 310 of FIG. 7 includes a nut 320 disposed within the spring cage 312, which retains the nut 320 in a set orientation. The spring cage 312 includes a back wall 318 and a plurality of cage arms 315,316, extending from the back wall 318, that retain the nut 320 by wrapping around the sides and at least part of the front thereof. Though the embodiment of FIG. 7 depicts two cage arms 315,316, it is contemplated that a cage nut fastener within the scope of the present invention can accommodate more or fewer cage arms. Additional flanges 317, extending from sides of one or more of the cage arms 315,316, may also be provided to wrap around the sides of the nut 320 to provide additional retention. The back wall 318 of the spring cage 312 includes an aperture (not illustrated) therethrough that is aligned with the threaded opening in the nut 320 such that the nut 320 and the spring cage 312 are capable of accommodating a fastener extending through both.

In a contemplated embodiment, the nut 320 is a floating nut that, although retained within the spring cage 312 and prevented from rotating, is not fixed to the spring cage 312 and is thus capable of at least slight movement within the cage 312. In other contemplated embodiments, the nut 320 is clamped firmly by the cage arms (i.e., fixed), or is part of a unitary structure that includes the cage, and is thus prevented from movement within, or relative to, the spring cage.

Each lever arm 313,314 has an inner portion 333,335 fixed to, and extending in a rearward direction from, the back wall 318 of the spring cage 312, and an outer portion 334,336 that doubles back on the respective inner portion 333,335 and extends around a respective side of the nut 320 to a front thereof. In this regard, the inner and outer portions of each lever arm 313,314 are generally aligned with one another, with each outer portion 334,336 being deflectable relative to the respective inner portion 333,335. Additionally, in at least some contemplated embodiments, the outer portion 334,336 of each lever arm 313,314 is curved away from the respective inner portion 333,335 so as to provide additional space (i.e., a larger gap) between the portions. Each lever arm 313,314 further includes an outwardly-extending tab 321,322 at a distal end thereof. The outwardly-extending tabs 321,322 extend in opposite directions from one another and, together, operate to facilitate securement of the cage nut fastener 310 to a mounting rail, frame member, or other equipment component without the aid of tools.

The cage nut fastener 310 of FIG. 7 can be installed against a frame member 40 in a manner similar to that of the cage nut fastener 110 of FIGS. 2-4, without the aid of tools. It is contemplated that a user can apply an inward compression force upon the lever arms 313,314 (and, particularly, upon the outer portions 334,336 of the lever arms 313,314). Application of an inward compression force upon the lever arms 313,314 compresses the outer portions 334,336 toward the respective inner portions 333,335 and, effectively, manipulates the spring cage 312 to a compressed state. In this compressed state, and with reference to FIGS. 5 and 7, the outwardly-extending tabs 321,322 of the lever arms 313,314 can be positioned through a selected aperture 32c of the frame member 40. Then, the inward compression force against the lever arms 313,314 can be released, thereby permitting the spring cage 312 to return to an uncompressed state such that the tabs 321,322 push outwardly against the sides of the aperture 32c. In this manner, the cage nut fastener 310 becomes clamped or secured against the frame member 40 (as can be seen in FIG. 5).

In another contemplated method of installation, the cage nut fastener 310 (in the compressed state) can be rotated into the clamped position against the frame member 40. In accordance with this contemplated method, one of the two outwardly-extending tabs 321,322 is seated against an edge of a selected aperture 32c, and the cage nut fastener 310 is then rotated around an axis so that the other of the two outwardly-extending tab is also positioned through the aperture 32c. With both tabs 321,322 positioned through the selected aperture 32c of the frame member 40, the inward compression force against the lever arms 313,314 can be released, thereby permitting the spring cage 312 to return to an uncompressed state such that the tabs 321,322 push outwardly against the sides of the aperture 32c. In this manner, the cage nut fastener 310 thereby becomes effectively clamped or secured against the frame member 40 (as can be seen in FIG. 5).

As with the cage nut fastener 110 discussed above in connection with FIGS. 2-4, the lever arms 313,314 of the cage nut fastener 310 provide the user with a mechanical advantage during the installation process. In particular, the lever arms 313,314 provide a user with enhanced leverage in manipulating the spring cage 312, by hand, in such a way that the tabs 321,322 may be inserted into the selected aperture 32c of the frame member 40, thereby eliminating the need for tools during the installation process. It is further contemplated that torque applied to the cage nut fastener 310 (such as by rotating the cage nut fastener 310 into the selected aperture 32c) further simplifies the installation process—particularly when torque is used in combination with a compression force applied to the lever arms 313,314.

Figure 8:
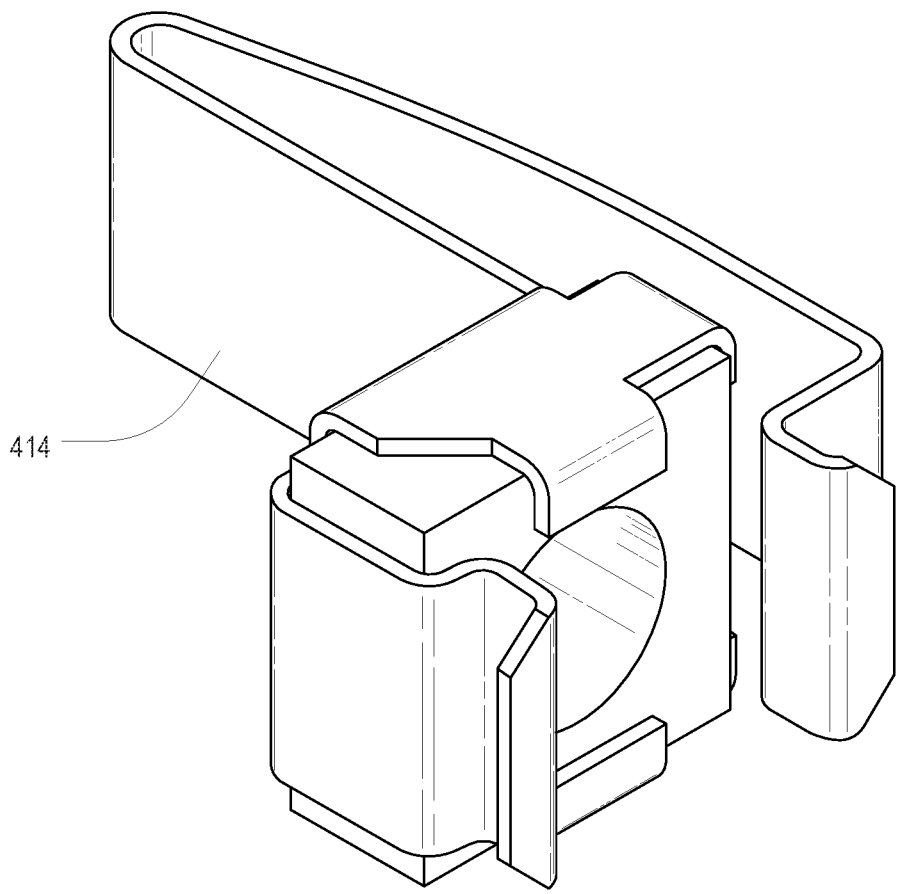
FIG. 8 is an isometric view of the third alternative cage nut fastener of FIG. 5.
Figure 9:
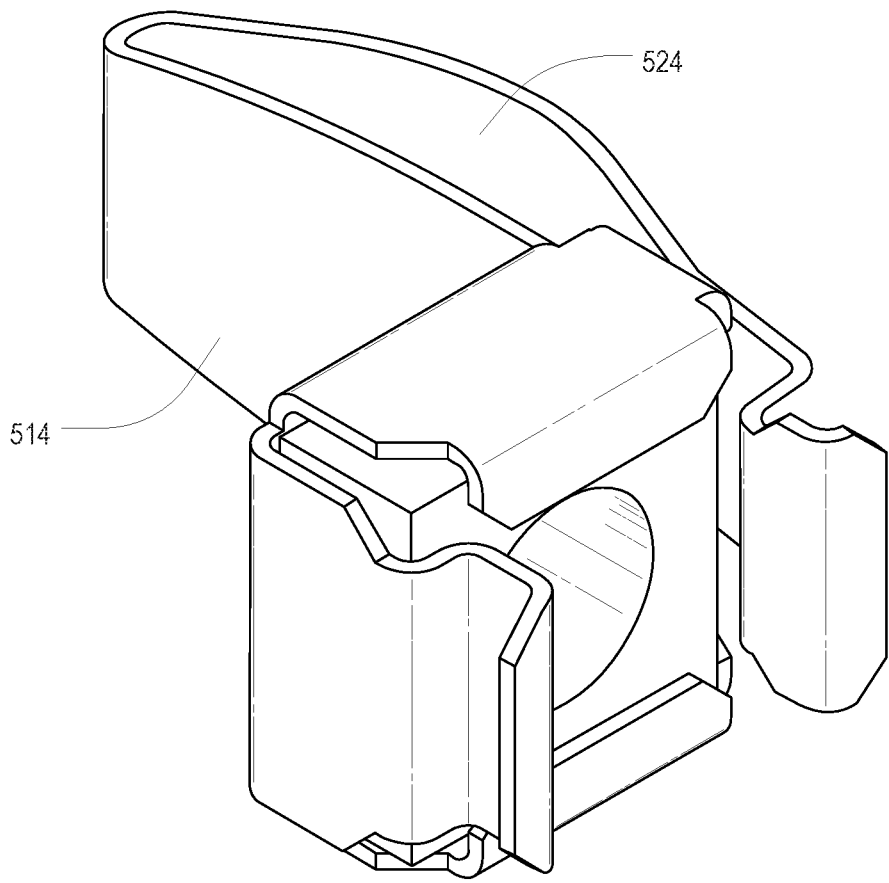
FIG. 9 is an isometric view of a fourth alternative cage nut fastener in accordance with a preferred embodiment of the present invention.

FIG. 8 is an isometric view of the third alternative cage nut fastener 410 of FIG. 5; and FIG. 9 is an isometric view of a fourth alternative cage nut fastener 510 in accordance with a preferred embodiment of the present invention. The cage nut fasteners 410,510 of FIGS. 8 and 9 are somewhat similar in form and in operation to the cage nut fastener 110 discussed above in connection with FIGS. 2-4, but with modified lever arms 414,514 that may provide an enhanced mechanical advantage during the installation process. In particular, the lever arm 414 of the cage nut fastener 410 shown in FIG. 8 is longer than that of the cage nut fastener of FIGS. 2-4, and the lever arm 514 of the cage nut fastener 510 of FIG. 9 has an outer portion 524 with even greater curvature than that of the cage nut fastener 110 of FIGS. 2-4. Increased length and/or enhanced curvature for the lever arm may assist, for example, in enabling a user to grasp a lever arm and/or apply greater compressive force to the lever arm.

It is contemplated that a cage nut fastener in accordance with one or more preferred embodiments of the present invention can be manufactured from any of a wide range of different materials. In one contemplated embodiment, the cage nut fastener, or at least portions thereof, is made from a sheet metal. In another contemplated embodiment, the cage nut fastener, or at least portions thereof, is made from a polymeric material. Furthermore, it is contemplated that a cage nut fastener in accordance with one or more preferred embodiments of the present invention can be made via an injection molding process.

Though the foregoing discussion and the accompanying drawings discuss installation of one or more cage nut fasteners to a conventional frame member, it is contemplated that a cage nut fastener in accordance with one or more preferred embodiments of the present invention can be installed on any of a wide range of different structures, including panels, rails, equipment, and the like.

It is contemplated that the parameters of the cage nut fastener can vary while remaining within the scope of the present invention. For example, it is contemplated that the size, shape and/or length of the lever arm can be varied across different embodiments. Additionally, it is contemplated that the size and/or shape of the nut and the cage for retaining the nut can vary to accommodate different types of threaded fasteners. It is also contemplated that the cage and/or the lever arm can be made from multiple parts that are assembled together to form a functioning cage nut fastener in accordance with one or more preferred embodiments of the present invention. Still further, it is contemplated that multiple cage nut fasteners in accordance with one or more preferred embodiments of the present invention can be joined together, either permanently or with the ability to be separated. In this latter respect, a multiple cage nut fastener structure can include two or more cage nuts joined together in a single assembly that can be installed against a structure having apertures corresponding with each cage nut.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method of installing a cage nut fastener against a frame member without the aid of tools, the method comprising:
   providing a cage nut fastener having a spring cage and a nut prevented from rotation within the spring cage, the spring cage including a cage arm and a lever arm, the lever arm including at least a portion that extends in a rearward direction behind a back wall of the spring cage;
   positioning a distal end of the cage arm through an aperture of a frame member so that the distal end rests against a side of the aperture;
   applying a compression force upon the lever arm, without the aid of tools, to manipulate the spring cage to a compressed state;
   positioning a distal end of the lever arm through the aperture; and
   releasing the compression force so that the spring cage returns to an uncompressed state, with distal ends of each of the cage arm and the lever arm pushing against respective opposite sides of the aperture, thereby securing the spring cage and the nut against the frame member.

2. The method of claim 1, wherein the cage arm and the lever arm are disposed at opposite sides of the spring cage.

3. The method of claim 1, wherein each of the cage arm and the lever arm includes an outwardly-extending tab at a distal end thereof.

4. The method of claim 3, wherein the outwardly-extending tab of the lever arm is disposed at a side of the spring cage that is offset from the portion of the lever arm that extends behind the back wall thereof.

5. The method of claim 1, wherein the lever arm includes outer and inner aligned portions.

6. The method of claim 5, wherein the outer aligned portion is arc-shaped so that the outer aligned portion curves away from the inner aligned portion.

7. The method of claim 5, wherein applying a compression force upon the lever arm includes squeezing the outer aligned portion toward the inner aligned portion.

8. The method of claim 1, wherein positioning the distal end of the lever arm through the aperture includes rotating the spring cage about an axis.

9. A method of installing a cage nut fastener against a frame member without the aid of tools, the method comprising:
   providing a cage nut fastener having a spring cage and a nut prevented from rotation within the spring cage, the spring cage including a first cage arm and a lever arm, the lever arm including outer and inner aligned portions that extend in a rearward direction behind a back wall of the spring cage;
   positioning a distal end of the first cage arm through an aperture of a frame member so that the distal end rests against a side of the aperture;
   applying a compression force upon the lever arm, without the aid of tools, to manipulate the spring cage to a compressed state, wherein the compression force upon the lever arm is applied by a user compressing the outer and inner aligned portions of the lever arm toward one another using a thumb and a forefinger;
   positioning a distal end of the lever arm through the aperture; and
   releasing the compression force so that the spring cage returns to an uncompressed state, with distal ends of each of the first cage arm and the lever arm pushing against respective opposite sides of the aperture, thereby securing the spring cage and the nut against the frame member.

10. The method of claim 9, wherein the first cage arm and the lever arm are disposed at opposite sides of the spring cage.

11. The method of claim 9, wherein each of the first cage arm and the lever arm includes an outwardly-extending tab at a distal end thereof.

12. The method of claim 9, wherein the outer aligned portion is arc-shaped so that the outer aligned portion curves away from the inner aligned portion.

13. The method of claim 9, wherein positioning the distal end of the lever arm through the aperture includes rotating the spring cage about an axis.

14. The method of claim 9, wherein the cage nut fastener further includes at least a second cage arm, wherein each of the first and second cage arms engages at least a side face and a front face of the nut to prevent the nut from rotation.

15. A method of installing a cage nut fastener against a frame member without the aid of tools, the method comprising:
   providing a cage nut fastener having a spring cage and a nut prevented from rotation within the spring cage, the spring cage including a first cage arm and a lever arm, the lever arm including outer and inner aligned portions that extend in a rearward direction behind a back wall of the spring cage;
   grasping the cage nut fastener by the outer and inner aligned portions of the lever arm;
   positioning a distal end of the first cage arm through an aperture of a frame member so that the distal end rests against a side of the aperture;
   squeezing the lever arm by applying an inward compression force against the outer and inner aligned portions, thereby manipulating the spring cage to a compressed state;
   positioning a distal end of the lever arm through the aperture; and
   releasing the inward compression force so that the spring cage returns to an uncompressed state, with distal ends of each of the first cage arm and the lever arm pushing against respective opposite sides of the aperture, thereby securing the spring cage and the nut against the frame member.

16. The method of claim 15, wherein each of the first cage arm and the lever arm includes an outwardly-extending tab at a distal end thereof.

17. The method of claim 15, wherein the inward compression force is applied by squeezing the lever arm between a user's thumb and forefinger.

18. The method of claim 15, wherein the outer aligned portion is arc-shaped so that the outer aligned portion curves away from the inner aligned portion.

19. The method of claim 18, wherein squeezing the lever arm maneuvers the outer aligned portion of the lever arm toward the inner aligned portion.

20. The method of claim 15, wherein the cage nut fastener further includes at least a second cage arm, wherein each of the first and second cage arms engages at least a side face and a front face of the nut to prevent the nut from rotation.

* * * * *